(12) United States Patent
Guo et al.

(10) Patent No.: US 10,192,042 B2
(45) Date of Patent: Jan. 29, 2019

(54) USER VERIFYING METHOD, TERMINAL DEVICE, SERVER AND STORAGE MEDIUM

(71) Applicant: TENCENT TECHNOLOGY (SHENZHEN) COMPANY LIMITED, Shenzhen (CN)

(72) Inventors: Jiwei Guo, Shenzhen (CN); Haibo Zuo, Shenzhen (CN); Luyi Lin, Shenzhen (CN); Yijun Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 253 days.

(21) Appl. No.: 15/131,785

(22) Filed: Apr. 18, 2016

(65) Prior Publication Data

US 2016/0232338 A1   Aug. 11, 2016

Related U.S. Application Data

(63) Continuation of application No. PCT/CN2014/088236, filed on Oct. 9, 2014.

(30) Foreign Application Priority Data

Oct. 18, 2013   (CN) .......................... 2013 1 0493355

(51) Int. Cl.
*H04L 9/32*    (2006.01)
*H04W 4/02*    (2018.01)
(Continued)

(52) U.S. Cl.
CPC .......... *G06F 21/316* (2013.01); *H04L 9/3271* (2013.01); *H04W 4/027* (2013.01);
(Continued)

(58) Field of Classification Search
CPC .. H04L 9/3271; H04L 2209/80; H04W 4/027; H04W 4/028; H04W 12/06;
(Continued)

(56) References Cited

U.S. PATENT DOCUMENTS 8,826,382 B2 *  9/2014  Sanghavi ................ G06F 21/31
                                                    345/168
9,239,916 B1 *  1/2016  Bailey ..................... G06F 21/36
(Continued)

FOREIGN PATENT DOCUMENTS

CN        101599298 A      12/2009
CN        102647504 A       8/2012
(Continued)

OTHER PUBLICATIONS

The World Intellectual Property Organization (WIPO) International Search Report for PCT/CN2014/088236 dated Feb. 3, 2015.
(Continued)

*Primary Examiner* — Hadi S Armouche
*Assistant Examiner* — Shu C Gao
(74) *Attorney, Agent, or Firm* — Anova Law Group, PLLC

(57) ABSTRACT

The present disclosure provides a user verifying method, a terminal device, a server and a storage medium. The method may include: receiving, by a terminal device, a motion instruction from a server, and displaying the motion instruction on a display interface of the terminal device; obtaining sensed data of a gyroscope equipped in the terminal device and sending the sensed data to the server; determining, by the server, whether a motion trail of the terminal device constructed according to the sensed data meets a requirement of the motion instruction; and determining, by the server, that a user of the terminal device passes a user verification if the motion trail of the terminal device con-
(Continued)

structed according to the sensed data meets the requirement of the motion instruction. The method ensures that only human can accomplish the verifying process, which promotes the security of the user verification and improves the user experience.

16 Claims, 4 Drawing Sheets

(51) Int. Cl.
  *H04W 4/029* (2018.01)
  *G06F 21/31* (2013.01)
  *H04W 12/06* (2009.01)
(52) U.S. Cl.
  CPC ......... *H04W 4/029* (2018.02); *H04W 12/06* (2013.01); *G06F 2221/2133* (2013.01); *H04L 2209/80* (2013.01)
(58) Field of Classification Search
  CPC ........... G06F 21/316; G06F 2221/2133; G06F 3/0346; G06F 3/017; G06F 3/012; G06F 3/013; G06F 21/31; G06F 21/36; G06F 2221/2103; G01C 21/20; G01C 21/16; G01C 21/18; G01C 21/165; G01C 21/06; G01C 21/08; G01C 21/00; G01C 21/14; G01C 21/04; G01C 21/10
  See application file for complete search history.

(56) References Cited

U.S. PATENT DOCUMENTS

| | | | |
|---|---|---|---|
| 9,262,913 B2* | 2/2016 | Yamada | G08C 17/02 |
| 9,274,597 B1* | 3/2016 | Karakotsios | G06F 3/0346 |
| 9,320,957 B2* | 4/2016 | Bentley | A63B 24/0006 |
| 9,397,841 B2* | 7/2016 | Godse | G06F 21/31 |
| 9,410,809 B2* | 8/2016 | Hogdal | G01C 21/20 |
| 9,465,927 B2* | 10/2016 | Makofsky | G06F 21/31 |
| 2008/0075243 A1 | 3/2008 | Kent et al. | |
| 2010/0328074 A1* | 12/2010 | Johnson | G06F 21/31 340/573.1 |
| 2011/0304531 A1* | 12/2011 | Brooks | G06F 1/1626 345/156 |
| 2013/0078952 A1* | 3/2013 | Yang | G06F 1/1694 455/411 |
| 2014/0082694 A1* | 3/2014 | Sanghavi | G06F 21/31 726/3 |
| 2015/0007289 A1* | 1/2015 | Godse | G06F 21/31 726/7 |

FOREIGN PATENT DOCUMENTS

| | | |
|---|---|---|
| CN | 102915184 A | 2/2013 |
| CN | 102957701 A | 3/2013 |
| CN | 103297835 A | 9/2013 |
| CN | 103297836 A | 9/2013 |
| CN | 103327386 A | 9/2013 |
| CN | 103853951 A | 6/2014 |

OTHER PUBLICATIONS

The State Intellectual Property Office of the People's Republic of China (SIPO) Office Action 1 for 201310493355.4 dated May 9, 2018 9 Pages (including translation).
The State Intellectual Property Office of the People's Republic of China (SIPO) Office Action 2 for 201310493355.4 Oct. 9, 2018 Pages (including translation).

* cited by examiner

USER VERIFYING METHOD, TERMINAL DEVICE, SERVER AND STORAGE MEDIUM

CROSS-REFERENCE TO RELATED APPLICATION

This application is a continuation of PCT Patent Application No. PCT/CN2014/088236, filed on Oct. 9, 2014, which claims priority to a Chinese patent application No. 201310493355.4 filed on Oct. 18, 2013 by Shenzhen Tencent Computer System Co., Ltd. and entitled "USER VERIFYING METHOD AND MOBILE TERMINAL", the entire contents of all of which are incorporated herein by reference.

TECHNICAL FIELD

The present disclosure relates to the field of communication technologies, and in particular to a user verifying method, a terminal device, a server and a storage medium.

BACKGROUND

Completely Automated Public Turing test to tell Computers and Humans Apart (CAPTCHA) is a common completely automated program for determining whether a user is a computer or human. In the process of the CAPTCHA test, a server automatically generates a question to be answered by the user. The question generated by the server is solvable by human only, but not by the computer, thus the user who solves the question is determined as human.

However, an Optical Character Recognition (OCR) technology has been developed by skilled persons as technologies develop. The Optical Character Recognition technology is utilized to analyze an image that is generated from scanning a document, to obtain information such as text contained in the image. Particularly, characters in the document are scanned by a digital scanning device such as a scanner and a digital camera to generate an image, then shapes of the characters are determined through distinguishing bright pixels and dark pixels in the image, and then the shapes of the characters are converted to corresponding computer texts by the Optical Character Recognition technology. Through the OCR technology, it is therefore possible for a computer to answer the question generated by the server.

In order to prevent a hacker from recognizing CAPTCHA codes and submitting answers by technologies such as the OCR technology, there is another type of existing CAPTCHA which provides a CAPTCHA image which is formed by lines and irregular characters. In verifying a user, a CAPTCHA code in the form of an image is generated by a server according to a preset rule, sent to a terminal device, and displayed on a display interface of the terminal device; the user examines the CAPTCHA code, recognizes a character string comprised of digitals, English letters, Chinese characters or other characters contained in the image of the CAPTCHA code, and then fills in the recognized character string which is then submitted to the server for a user verification; and the server determines whether the submitted character string conforms to that contained in the image of the CAPTCHA code, and if the submitted character string conforms to that contained in the image, the user is determined as human, as illustrated in FIG. 1 which is a schematic view showing the CAPTCHA code in the prior art a conventional method.

However, the CAPTCHA code in the form of the image comprised of lines and irregular characters is defective in the prior art. Once enough samples are collected by hackers, such CAPTCHA code in the form of the image may be recognized automatically by a computer program which is trained by means of the OCR technology. Even if such CAPTCHA code is optimized and improved, the CAPTCHA code will still be recognized automatically by the computer program as long as the number of images from a background image library for the CAPTCHA code is limited. Therefore, the security of the existing CAPTCHA code in the form of the image is unsatisfying.

Additionally, in order to promote the capability against the automatic recognition made by the computer program, the difficulty in recognizing such CAPTCHA code in the form of an image is increased, but at the same time the recognition by human users is affected as well and hence the user experience is degraded. Though such CAPTCHA code is always shown with a hint of "click to change CAPTCHA code" which can be clicked to get a new CAPTCHA code, the user experience is still poor due to the high recognition difficulty.

BRIEF SUMMARY OF THE DISCLOSURE

In view of the above, embodiments of the present invention provide a user verifying method, a terminal device, a server and a storage medium, which are used to verify the user by a terminal device through indicating corresponding motion instruction to the user, to assure that only human can accomplish the verifying process, which promotes the security of the user verification and improves the user experience.

One aspect of the present disclosure provides a user verifying method. The method may include: receiving, by a terminal device, a motion instruction from a server, and displaying the motion instruction on a display interface of a terminal device; and obtaining sensed data of a gyroscope equipped in the terminal device and sending, by the terminal device, the sensed data obtained by the terminal device. The sensed data sent to the server is configured for the server to determine whether the motion trail of the terminal device meets a requirement of the motion instruction.

Another aspect of the present disclosure provides a user verifying method. The method may include: receiving, by a server, the sensed data of a terminal device sensed by a gyroscope equipped in the terminal device; constructing a motion trail of the terminal device according to the sensed data; determining whether the motion trail of the terminal device constructed according to the sensed data meets a requirement of the motion instruction; and determining that a user of the terminal device passes a user verification if the motion trail of the terminal device constructed according to the sensed data meets the requirement of the motion instruction.

Another aspect of the present disclosure provides a terminal device. The terminal device may include a receiving module configured to receive a motion instruction from a server, and display the motion instruction on a display interface of the terminal device; an obtaining module configured to obtain sensed data of a gyroscope equipped in the terminal device after the motion instruction is received by the receiving module; and a sending module configured to send the sensed data obtained by the obtaining module to the server. The sensed data sent to the server is configured for the server to determine whether the motion trail of the terminal device meets a requirement of the motion instruction.

Another aspect of the present disclosure provides a server. The server may include a receiving module configured to receive sensed data of a terminal device sensed by a gyroscope equipped in the terminal device; a determining module configured to construct a motion trail of the terminal device according to the sensed data and determine whether the motion trail of the terminal device meets a requirement of the motion instruction, after the sensed data is received by the receiving module; and a second determining module configured to determine that a user of the terminal device passes a user verification if the motion trail of the terminal device constructed according to the sensed data meeting the requirement of the motion instruction is determined by the determining module.

A non-transitory storage medium comprising computer-executable instructions, where the computer-executable instructions are configured to perform a user verifying method when being executed by a computer processor, and the method comprises: receiving, by a terminal device, a motion instruction from a server, and displaying the motion instruction on a display interface of a terminal device; obtaining sensed data of a gyroscope equipped in the terminal device and sending the sensed data obtained by the terminal device, where the sensed data sent to the server is configured for the server to determine whether the motion trail of the terminal device meets a requirement of the motion instruction.

Another aspect of the present disclosure provides a non-transitory storage medium comprising computer-executable instructions, where the computer-executable instructions are configured to perform a user verifying method when being executed by a computer processor, and the method comprises: receiving, by a server, the sensed data of a terminal device sensed by a gyroscope equipped in the terminal device; constructing a motion trail of the terminal device according to the sensed data; determining whether the motion trail of the terminal device meets a requirement of the motion instruction; and determining that a user of the terminal device passes a user verification if the motion trail of the terminal device constructed according to the sensed data meets the requirement of the motion instruction.

There are several advantages which can be seen from previous aspects of the present invention as followings.

After a motion instruction is received by the terminal device from the server, it is then displayed on the interface of the terminal, device to prompt the user to follow the motion instruction for verifying; the terminal device obtains the sensed data of the gyroscope equipped in the terminal device and sends the sensed data to the server; and the server receives the sensed data from the terminal device and determines whether the motion trail of the terminal device constructed according to the sensed data meets a requirement of the motion instruction, and if the motion trail of the terminal device meets the requirement of the motion instruction, the server determines that the user passes the user verification, such that it is assured that only human can accomplish the verifying process, which promotes the security of the user verification and improves the user experience.

Other aspects of the present disclosure can be understood by those skilled in the art in light of the description, the claims, and the drawings of the present disclosure.

DETAILED DESCRIPTION OF THE EMBODIMENTS

A user verifying method, a terminal device, a server and a storage medium according to embodiments of the present invention are provided to verify a user via a terminal device, where the user is requested to follow a corresponding motion instruction, to ensure that only human can accomplish the motion instruction, thereby promoting the security of the user verification and improving the user experience.

Figure 7:
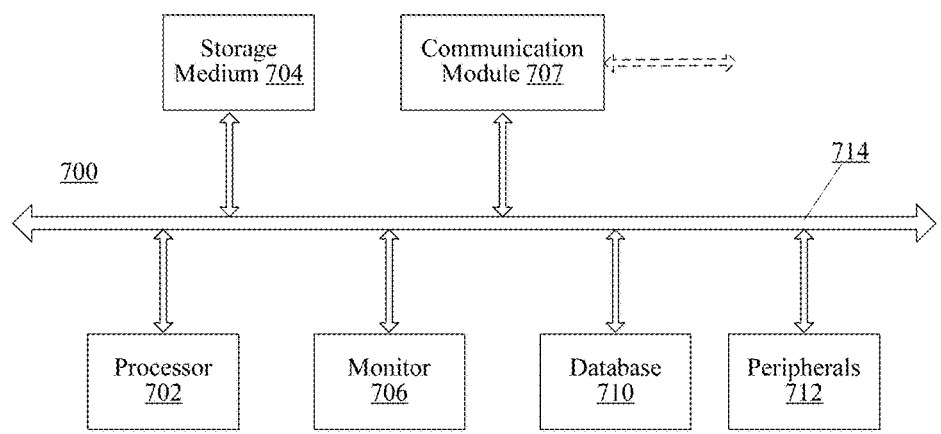
FIG. 7 illustrates an exemplary computing system consistent with the disclosed embodiments.

FIG. 7 depicts an exemplary environment incorporating exemplary methods and apparatus for verifying a user in accordance with various disclosed embodiments. As shown in FIG. 7, the environment 700 can include a server 704, a terminal 706, and a communication network 702. The server 704 and the terminal 706 may be coupled through the communication network 702 for information exchange, such as user authentication, verifying whether a user is a human or a computer, etc. Although only one terminal 706 and one server 704 are shown in the environment 700, any number of terminals 706 or servers 704 may be included, and other devices may also be included.

The communication network 702 may include any appropriate type of communication network for providing network connections to the server 704 and terminal 706 or among multiple servers 704 or terminals 706. For example, the communication network 702 may include the Internet or other types of computer networks or telecommunication networks, either wired or wireless.

A terminal, as used herein, may refer to any appropriate user terminal with certain computing capabilities including, e.g., displaying a verification interface for a user to input verification information by moving the terminal according to an instruction shown in the verification interface, sensing the moving direction of the terminal using a gyroscope, sending the sensed information to a server for verification, reporting verification success or failure on the verification interface. For example, a terminal can be a personal computer (PC), a work station computer, a server computer, a hand-held computing device (tablet), a mobile terminal (a mobile phone or a smart phone), or any other user-side computing device.

A server, as used herein, may refer to one or more server computers configured to provide certain server functionalities, such as authenticating a user. As in various embodiments disclosed herein, a verification server can send a verification instruction, receive a verification input from a terminal, and determine whether the verification input matches the verification instruction. The server may also include one or more processors to execute computer programs in parallel.

The server 704 and the terminal 706 may be implemented on any appropriate computing platform. FIG. 8 shows a block diagram of an exemplary computing system 800 capable of implementing the server 704 and/or the terminal 706. As shown in FIG. 8, the exemplary computer system 800 may include a processor 802, a storage medium 804, a monitor 806, a communication module 808, a database 810, peripherals 812, and one or more bus 814 to couple the devices together. Certain devices may be omitted and other devices may be included.

The processor 802 can include any appropriate processor or processors. Further, the processor 802 can include multiple cores for multi-thread or parallel processing. The storage medium 804 may include memory modules, such as ROM, RAM, and flash memory modules, and mass storages, such as CD-ROM, U-disk, removable hard disk, etc. The storage medium 804 may store computer programs or program modules for implementing various processes, when executed by the processor 802.

The monitor 806 may include display devices for displaying information. For example, the monitor 806 of the terminal 706 can be used to display a verification page, etc. The communication module 808 may include network devices for establishing connections through the communication network 702. The database 810 may include one or more databases for storing certain data and for performing certain operations on the stored data. For example, the database 810 of the server 704 can be used to store verification instructions, store requirements to verify data from the terminal, store and read user authentication profiles, etc.

Further, the peripherals 812 may include I/O devices such as keyboard, mouse, motion sensor, position sensor, etc. For example, the peripherals 812 of the terminal 706 can be used to detect a movement of the terminal 706, or a movement of a game/remote control of the terminal 706.

In operation, the terminal 706 may cause the server 704 to perform certain actions, such as returning an instruction, verifying an input or other database operations. The server 704 may be configured to provide structures and functions for such actions and operations. More particularly, the server 704 may be a verification server to determine whether a user of the terminal 706 is a computer or a human.

In various embodiments, a terminal such as a user-side electronic device involved in the disclosed methods and systems can include the terminal 706, while a verification server involved in the disclosed methods and systems can include the server 704.

Unless otherwise specified, the disclosed methods and apparatus can be executed by a user-side electronic device, such as a personal computer (PC), a work station computer, a hand-held computing device (tablet), a mobile terminal (a mobile phone or a smart phone), or any other user-side computing device. As used herein, unless otherwise specified, the term "user-side electronic device" in this disclosure may be referred to as "electronic device".

Figure 2:
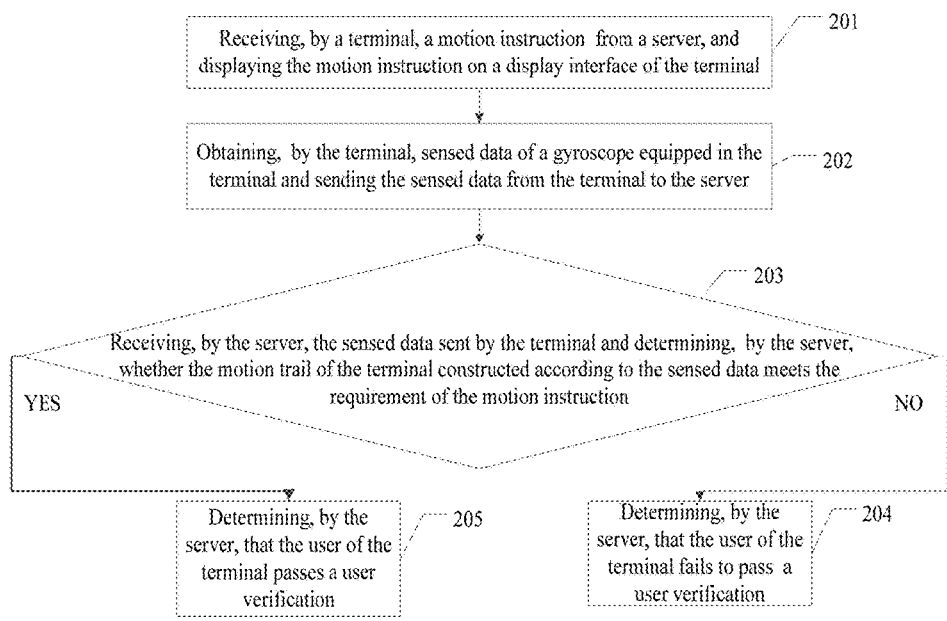
FIG. 2 is a schematic diagram showing a flow chart of a user verifying method according to an embodiment of the present invention.

As illustrated in FIG. 2, a user verifying method of an embodiment of the present invention includes the following Steps 201 to 205.

At Step 201, a motion instruction is received by a terminal device from a server, and displayed on a display interface of the terminal device.

In the above embodiment of the present invention, when a user is logging in to an account via a terminal device, in order to make sure that the account is logged in by human, a motion instruction is generated by a server and sent to the terminal device from the server. Upon receiving the motion instruction from the server, the terminal device displays the motion instruction on a display interface of the terminal device to prompt the user to follow the motion instruction, i.e. to perform a motion according to the motion instruction, for the purpose of verifying the user. In some embodiments, the display interface on the terminal device may include an input box for username, an input box for password, and the motion instruction received from the server. The display interface may show the motion instruction by a text, a picture, and/or an animation.

In embodiments of the present invention, the motion instruction generated by the server may include any motion that can be detected by a motion sensor (e.g., a gyroscope), such as: a shaking up and down instruction, a shaking left and right instruction, a tilting forward instruction, a tilting backward instruction, a tilting left instruction, a tilting right instruction, an instruction for following a symbol stroke (e.g., drawing a circle vertically/horizontally), or a combination of at least two of the above instructions. In some embodiments, when a user does not want to follow a specific motion instruction, the server may send a different instruction to be shown on the display interface on the terminal device in response to a user tapping the current motion instruction or selecting a change button on the display interface.

At Step 202, sensed data of a gyroscope equipped in the terminal device is obtained by the terminal device and sent from the terminal device to the server.

In the embodiment of the present invention, the sensed data of the gyroscope equipped in the terminal device is obtained after the motion instruction is displayed on the interface of the terminal device and sent from the terminal device to the server, where the gyroscope is also referred to as an angular velocity sensor and is employed to sense a rotational angular velocity of an object in deflecting. Therefore, motions including rotation and deflection of the terminal device such as a mobile phone and a personal digital assistant can be well measured by a gyroscope equipped in the terminal device. The data measured by the gyroscope is also referred to as sensed data of the gyroscope, and additionally, the sensed data may be sent in real time to a processor inside the terminal device for processing. The sensed data sent to the server is used by the server to determine whether the motion trail of the terminal device meets a requirement of the motion instruction.

In the above embodiment of the present invention, the sensed data of the gyroscope equipped in the terminal device may be obtained by the terminal device. The sensed data obtained by the terminal device may be sent to the server and analyzed by the server, to analyze the motion of the user holding the terminal device and determine the motion trail of the terminal device.

At Step 203, the server receives the sensed data sent by the terminal device, constructs a motion trail of the terminal device according to the sensed data and determines whether the motion trail of the terminal device constructed according to the sensed data meets the requirement of the motion instruction, and if the motion trail of the terminal device meets the requirement of the motion instruction, the method proceeds with Step 204.

In the embodiment of the present invention, the server receives the sensed data sent by the terminal device, determines whether the motion trail of the terminal device constructed according to the sensed data meets the requirement of the motion instruction, to verify whether the user passes the user verification.

At Step 204, the server determines that the user of the terminal device passes the user verification.

In the above embodiment of the present invention, if the server determines that the motion trail of the terminal device constructed according to the sensed data meets the requirement of the motion instruction sent by the server, the server determines that the user of the terminal device (i.e. the user holding the terminal device) passes the user verification, i.e., it is confirmed that the user logging in to the account through the terminal device is human.

In the above embodiment of the present invention, if the server determines that the motion trail of the terminal device constructed according to the sensed data does not meet the requirement of the motion instruction sent by the server, Step 205 is performed, and at Step 205, the user verification of the user is determined as failed, and the display interface on the terminal device may instruct the user to conduct the verification again with a same or a new motion instruction if the number of failures of the user verification conducted on a user account of the user for verifying or conducted through the terminal device with the same Internet Protocol (IP) address is less than a preset value. In some embodiments, the user may be prohibited to be verified again until a preset period has passed if the number of failures of the user verification conducted on the user account for verifying or conducted through the terminal device with the same IP address is equal to or more than the preset value.

In the above embodiments of the present invention, the motion instruction is received by the terminal device from the server and then displayed on the interface of the terminal device, to prompt the user to follow the motion instruction for verifying; the terminal device obtains the sensed data of the gyroscope equipped in the terminal device, and sends the sensed data to the server; and the server receives the sensed data from the terminal device and determines whether the motion trail of the terminal device constructed according to the sensed data meets a requirement of the motion instruction, and if the motion trail of the terminal device meets the requirement of the motion instruction, the server determines that the user passes the user verification. As such, both the security of the user verification and the user experience are improved.

Figure 3:
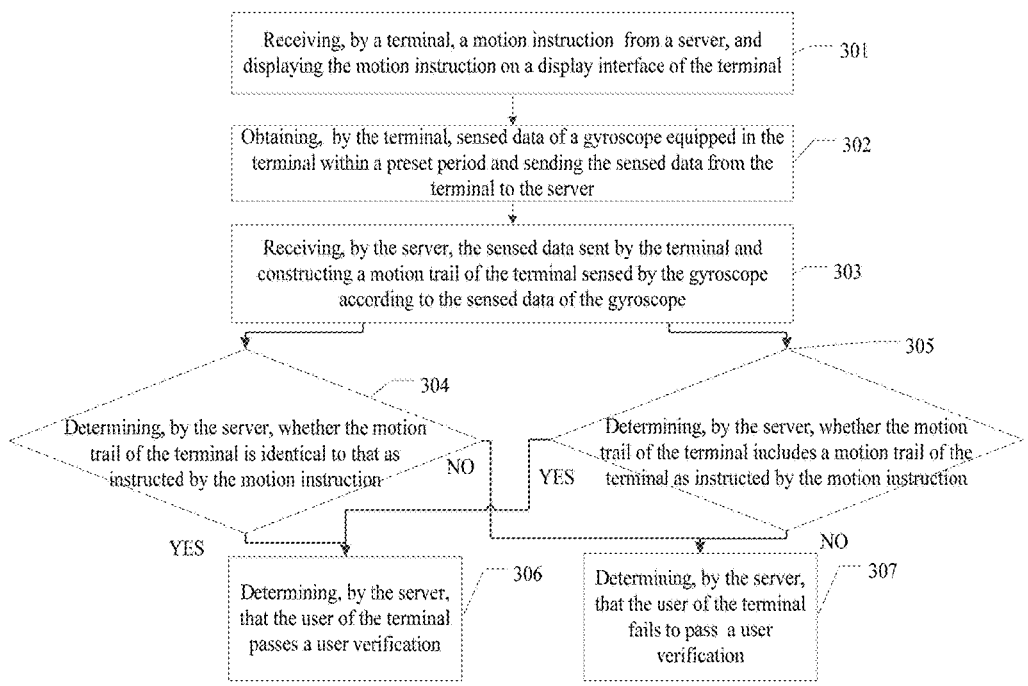
FIG. 3 is a schematic diagram showing a flow chart of a user verifying method according to another embodiment of the present invention.

In order to better understand the solution of the present disclosure, a user verifying method according to another embodiment of the present invention will be described below, as illustrated in FIG. 3, and the method includes the following Steps 301 to 307.

At Step 301, a motion instruction is received by a terminal device from a server, and displayed on a display interface of the terminal device.

Figure 1:
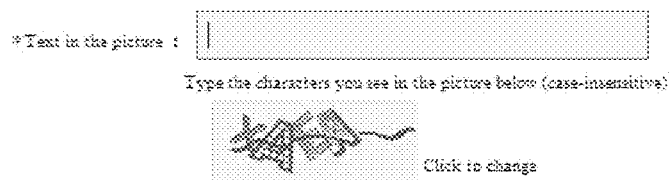
FIG. 1 is a schematic view showing a CAPTCHA code in a conventional method.

Step 301 is as same as Step 201 described in the embodiment illustrated in FIG. 1, and thus will not be repeatedly described here.

At Step 302, sensed data of a gyroscope equipped in the terminal device within a preset period is obtained by the terminal device and sent from the terminal device to the server.

In the embodiment of the present invention, the sensed data of the gyroscope within the preset period is obtained by the terminal device and sent to the server, after the motion instruction is received by the terminal device and displayed on the interface of the terminal device.

In one embodiment, the preset period may be a default period set in the terminal device or set by the server through the motion instruction. For example, the display interface on the terminal device may show a time countdown of the preset period together with the motion instruction. Setting a preset period is advantageous to prevent the terminal device from obtaining excessive sensed data which is irrelative to the motion instruction and to avoid too much data to be processed by the terminal device. The sensed data within the preset period may be obtained by the terminal device and the motion trail of the terminal device is constructed by analyzing the sensed data of the gyroscope within the preset period, to effectively reduce the load of data processing in the terminal device, and reduce the interference caused by user motions irrelative to the motion instruction.

In another embodiment, after the motion instruction is displayed on the interface of the terminal device, and before the terminal device is moved by the user according to the motion instruction, a start button on the display interface may be selected by a user. In response, the display interface on the terminal device may show a time countdown of the preset period after the user selects the start button. The sensed data of the gyroscope before the countdown ends may be obtained by the terminal device and sent to the server.

In another embodiment, after the motion instruction is displayed on the interface of the terminal device, the terminal device is moved by the user according to the motion instruction, such as shaking left and right; after the shaking of the terminal device is completed, a button on the display interface is clicked by the user to indicate that the motion of the terminal device made by the user is completed, and sensed data of the gyroscope within a period, which is from the time when the motion instruction is displayed by the terminal device to the time when the user clicks the button to indicate that the motion of the terminal device is completed, is obtained in response to the user operation of clicking the button, and the period may be regarded as the preset period.

In another embodiment, after the motion instruction is displayed on the interface of the terminal device, and before the terminal device is moved by the user according to the motion instruction, a start button on the display interface is clicked by the user and then the terminal device is moved by the user according to the motion instruction. After the motion instruction has been completed by the user, an end button on the display interface may be clicked by the user to confirm the completion of the motion instruction, and the sensed data of the gyroscope within a period between the time when the start button is clicked and the time when the end button is clicked, and the period may be regarded as the preset period.

At Step 303, the sensed data sent by the terminal device is received by the server and a motion trail of the terminal device is constructed from the sensed data of the gyroscope by the server, then the method proceeds with Step 304 or Step 305.

In the embodiment of the present invention, the sensed data sent by the terminal device is received by the server and the motion trail of the terminal device sensed by the gyroscope is constructed from the sensed data of the gyroscope in the terminal device. In some embodiments, the terminal device may construct the motion trail according to the sensed data of the gyroscope and local calibration data of the gyroscope, and send the constructed motion trail to the server.

The gyroscope equipped in the terminal device is a three-axis gyroscope, which is also referred to as micro-electromechanical gyroscope. A micro magnetic body is arranged in the three-axis gyroscope and may be moved in 3 directions (i.e. an X axis, a Y axis and a Z axis of a coordinate system) in space under the effect of a Coriolis force generated when the terminal device is moving, the movement direction and acceleration of the micro magnetic body is recorded when the terminal device is moving, and such data detected by the gyroscope is converted to sensed data interpretable by the terminal device such that the motion trail of the terminal device may be constructed from the sensed data of the gyroscope. The sensed data sent to the server is configured for the server to determine whether the motion trail of the terminal device meets a requirement of the motion instruction. In some embodiments, the motion instruction may include performing a first movement within a first time period, and performing a second movement within a second time period after the first time period. The server may determine whether both motion trails of the terminal device are performed in a correct sequence and meet requirements of the motion instruction.

At Step 304, the server determines whether the motion trail of the terminal device is identical to that as instructed by the motion instruction, and if the motion trail of the terminal device is identical to that as instructed by the motion instruction, Step 306 is performed.

At Step 305, the server determines whether the motion trail of the terminal device includes a motion trail of the terminal device as instructed by the motion instruction, and if the motion trail of the terminal device includes a motion trail of the terminal device as instructed by the motion instruction, Step 306 is performed.

In the above embodiment of the present invention, it is determined whether the motion trail of the terminal device that is constructed from the sensed data of the gyroscope is identical to that as instructed by the motion instruction, or it is determined whether the motion trail of the terminal device that is constructed from the sensed data of the gyroscope includes a motion trail of the terminal device as instructed by the motion instruction, and the corresponding subsequent step is performed according to the result of the determination.

At Step 306, the server determines that the user passes the user verification.

In the above embodiment of the present invention, if the constructed motion trail of the terminal device is identical to that as instructed by the motion instruction or the constructed motion trail of the terminal device includes the motion trail of the terminal device as instructed by the motion instruction, the server determines that the user passes the user verification and is human, i.e., the user who is logging in to the account through the terminal device is determined as human.

It is noted that, in the present embodiment, if the constructed motion trail of the terminal device is not identical to that as instructed by the motion instruction or the constructed motion trail of the terminal device does not include the motion trail of the terminal device as instructed by the motion instruction, Step 307 is performed, and at Step 307 the server determines that the user fails to pass the user verification.

In the above embodiment of the present invention, the motion instruction received by the terminal device from the server is displayed on the display interface of the terminal device to prompt the user to follow the motion instruction for verifying; then, sensed data of a gyroscope equipped in the terminal device within a preset period is obtained by the terminal device and sent to the server, the motion trail of the terminal device is constructed from the sensed data of the gyroscope by the server which receives the sensed data sent by the terminal device; and then and the server determines whether the received motion trail is identical to that as instructed by the motion instruction or whether the received motion trail includes a motion trail of the terminal device as instructed by the motion instruction, and if so, the server determines that the user passes the user verification, such that it is ensured that only human can accomplish the verifying process, which promotes the security of the user verification and improves the user experience.

Figure 4:
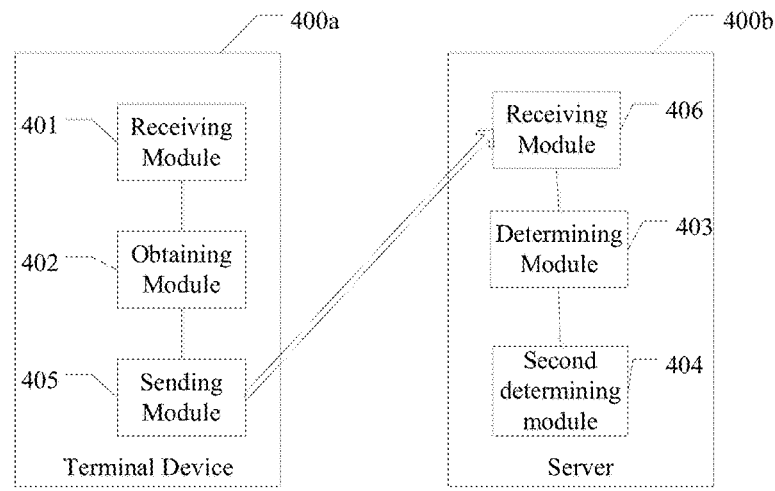
FIG. 4 is a schematic view showing a terminal device and a server communicated with the terminal device according to an embodiment of the present invention.

As illustrated in FIG. 4, a terminal device 400a of an embodiment of the present invention may include: a receiving module 401, which is configured to receive a motion instruction sent by a server 400b, and display the motion instruction on a display interface; an obtaining module 402, which is configured to obtain sensed data of a gyroscope equipped in the terminal device 400a after the motion instruction is received by the receiving module 401; and a sending module 405, which is configured to send the sensed data obtained by the obtaining module 402 to the server 400b, where the sensed data sent to the server is configured for the server to determine whether the motion trail of the terminal device meets a requirement of the motion instruction.

Further, as illustrated in FIG. 4, a server 400b of an embodiment of the present invention may include: a receiving module 406, which is configured to receive sensed data of a terminal device 400a sensed by a gyroscope equipped in the terminal device 400a; a determining module 403, which is configured to construct a motion trail of the terminal device according to the sensed data and determine whether a motion trail of the terminal device 400a constructed according to the sensed data meets the requirement of the motion instruction, after the sensed data is received by the receiving module 406; and a second determining module 404, which is configured to determine that a user of the terminal device 400a passes a user verification if the motion trail of the terminal device 400a constructed according to the sensed data meeting the requirement of the motion instruction is determined by the determining module 403.

In the above embodiment of the present invention, the receiving module 401 of the terminal device 400a receives a motion instruction sent by a server and displays the motion instruction on a display interface of the terminal device 400a; the obtaining module 402 obtains sensed data of a gyroscope equipped in the terminal device and the sending module 405 sends the sensed data to the server 400b; and then the receiving module 406 of the server 400b receives the sensed data sent by the sending module 405 of the terminal device 400a and the determining module 403 determines whether a motion trail of the terminal device constructed according to the sensed data meets the requirement of the motion instruction; the second determining module 404 determines that a user of the terminal device 400a passes a user verification if the motion trail of the terminal device 400a constructed according to the sensed data meeting the requirement of the motion instruction is determined by the determining module 403.

In the above embodiment of the present invention, the motion instruction is received by the terminal device from the server and then displayed on the interface of the terminal device, to prompt the user to follow the motion instruction for verifying; the terminal device obtains the sensed data of the gyroscope equipped in the terminal device, and sends the sensed data to the server; and the server receives the sensed data from the terminal device and determines whether the motion trail of the terminal device constructed according to the sensed data meets a requirement of the motion instruction, and if the motion trail of the terminal device meets the requirement of the motion instruction, the server determines that the user passes the user verification. As such, both the security of the user verification and the user experience are improved.

Figure 5:
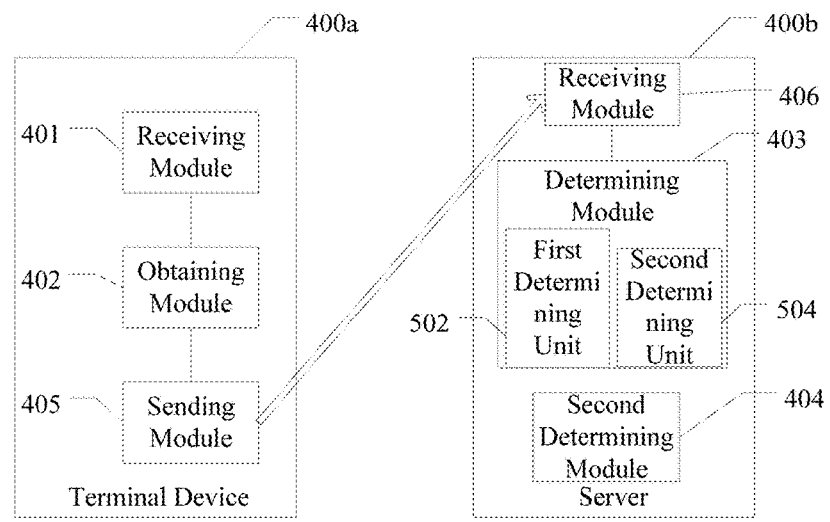
FIG. 5 is a schematic view showing a terminal device and a server communicated with the terminal device according to another embodiment of the present invention.
Figure 6:
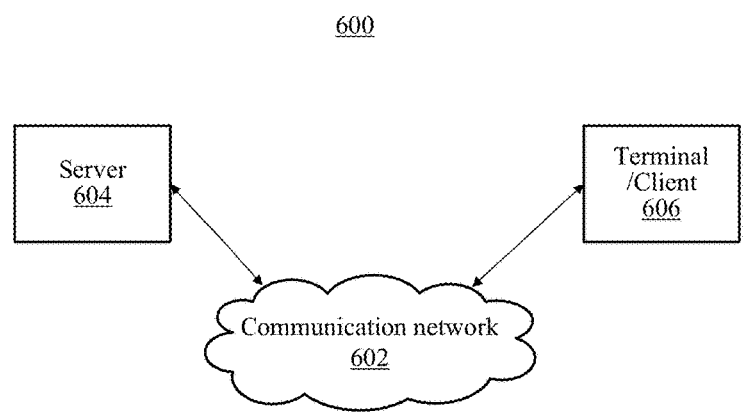
FIG. 6 illustrates an exemplary environment incorporating certain embodiments of the present invention.

As illustrated in FIG. 5, a terminal device 400a according to an embodiment of the present includes: a receiving module 401, an obtaining module 402, and a sending module 405 as illustrated in FIG. 4, and a server 400b according to the embodiment of the present includes: a receiving module 406, a determining module 403 and a second determining module 404 as illustrated in FIG. 4, where each module is functioning as same as the corresponding module in FIG. 4 with same name and will not be repeatedly described.

In the above embodiment of the present invention, the obtaining module 402 is particularly configured to obtain sensed data of a gyroscope equipped in the terminal device within a preset period.

In one embodiment, the determining module 403 may include: a first determining unit 502, which is configured to determine whether the constructed motion trail is identical to a motion trail of the terminal device as instructed by the motion instruction.

In another, the determining module 403 may include: a second determining unit 504, which is configured to determine whether the constructed motion trail includes a motion trail of the terminal device as instructed by the motion instruction.

In the above embodiment of the present invention, the motion instruction may include any one of: a shaking up and down instruction, a shaking left and right instruction, a tilting forward and backward instruction, a tilting left and right instruction, and a symbol stroke following instruction, or a combination of at least two of the above instructions.

In the above embodiment of the present invention, the receiving module 401 of the terminal device 400a receives a motion instruction sent by a server and displays it on a display interface of the terminal device 400a; the obtaining module 402 obtains sensed data of a gyroscope equipped in the terminal device within a preset period and the sending module 405 sends the sensed data to the server 400b; and then the receiving module 406 of the server 400b receives the sensed data sent by the sending module 405 of the terminal device 400a and the determining module 403 determines whether a motion trail of the terminal device constructed according to the sensed data meets the requirement of the motion instruction, where the determining module 403 constructs the motion trail of the terminal device according to the sensed data of the gyroscope and the first determining unit 502 determines whether the constructed motion trail is identical to a motion trail of the terminal device as instructed by the motion instruction, or the determining module 403 constructs the motion trail of the terminal device according to the sensed data of the gyroscope and the second determining unit 504 determines whether the constructed motion trail includes a motion trail of the terminal device as instructed by the motion instruction; and then the second determining module 404 determines that a user of the terminal device 400a passes the user verification if the motion trail of the terminal device 400a constructed according to the sensed data meeting the requirement of the motion instruction is determined by the determining module 403.

In the above embodiment of the present invention, the motion instruction received by the terminal device from the server is displayed on the display interface of the terminal device to prompt the user to follow the motion instruction for verifying; then, sensed data of a gyroscope equipped in the terminal device within a preset period is obtained by the terminal device and sent to the server, the motion trail of the terminal device is constructed from the sensed data of the gyroscope by the server which receives the sensed data sent by the terminal device; and then and the server determines whether the received motion trail is identical to that as instructed by the motion instruction or whether the received motion trail includes a motion trail of the terminal device as instructed by the motion instruction, and if so, the server determines that the user passes the user verification, such that it is ensured that only human can accomplish the verifying process, which promotes the security of the user verification and improves the user experience.

In light of the description of the above embodiments, it should be understood by the skilled person in the art that the present invention can be embodied by software and the necessary universal hardware, or merely hardware, but mostly the former is a preferable embodiment. Based on this understanding, the technical solution of the present invention may be substantially embodied in a software product or a part of the technical solution that contributes to the prior art may be embodied in a software product, and the computer software can be stored in the storage medium which may be a floppy disk, a Read-only Memory, a Random Access Memory, a Flash, a hard disk, an optical disk and the like, instructions included in the software product are configured to instruct a computer device (such as a personal computer, a server or a network device) to execute the method described in the embodiments of the present invention. A non-transitory storage medium including computer-executable instructions is provided by the present invention, where the computer-executable instructions are configured to perform a user verifying method, and the method includes: receiving, by a terminal device, a motion instruction from a server, and displaying the motion instruction on a display interface of a terminal device; obtaining sensed data of a gyroscope equipped in the terminal device and sending the sensed data obtained by the terminal device, where the sensed data sent to the server is configured for the server to determine whether the motion trail of the terminal device meets a requirement of the motion instruction. Another non-transitory storage medium including computer-executable instructions is provided by the present invention, where the computer-executable instructions are configured to perform a user verifying method, and the method includes: receiving, by a server, the sensed data of a gyroscope equipped in a terminal device sent by the terminal device; constructing a motion trail of the terminal device according to the sensed data and determining whether the motion trail of the terminal device constructed according to the sensed data meets a requirement of the motion instruction; and determining that a user of the terminal device passes the user verification if the motion trail of the terminal device constructed according to the sensed data meets the requirement of the motion instruction.

A user verifying method, a terminal device, a server and a storage medium according to the present invention are described above. And modifications can be made in accordance with the embodiments and application scope according to the concept of the present invention by the skilled person in the prior art. After all, the present description is not a limitation of the present invention.

What is claimed is:

1. A user verifying method, comprising:
   receiving, by a terminal device, a motion instruction from a server;
   displaying the motion instruction on a display interface of the terminal device;
   displaying a time countdown of a preset period together with the motion instruction on the display interface of the terminal device;
   obtaining a sensed data of a gyroscope equipped in the terminal device after the motion instruction is received and before the time countdown ends;
   sending the sensed data obtained by the terminal device to the server; and
   receiving a verification result from the server, the verification result being determined according to whether the motion trails of the terminal device meet a requirement of the motion instruction based on the sensed data,
   wherein:
   the motion instruction includes: performing a first movement within a first time period and performing a second movement within a second time period after the first time period; and
   sending the sensed data comprises: sending the sensed data carrying motion trails of both the first movement and the second movement to the server.

2. The method according to claim 1, wherein a movement instruction carried in the motion instruction includes at least one of: shaking up and down, shaking left and right, tilting forward, tilting backward, tilting left, tilting right, and following a symbolic stroke.

3. The method according to claim 1, further comprising:
   displaying a start button on the display interface when receiving the motion instruction from the server; and
   starting the time countdown after receiving a user selection on the start button.

4. The method according to claim 3, further comprising:
   displaying an end button on the display interface when obtaining the sensed data;
   receiving a user selection on the end button; and
   obtaining the sensed data of the gyroscope within a period between a time when the start button is selected and a time when the end button is selected.

5. The method according to claim 1, wherein a movement instruction carried in the motion instruction includes: following a symbolic stroke while holding the terminal device at a predefined direction.

6. The storage medium according to claim 5, wherein the computer program instructions further cause the processor to perform:
   displaying an end button on the display interface when obtaining the sensed data;
   receiving a user selection on the end button; and
   obtaining the sensed data of the gyroscope within a period between a time when the start button is selected and a time when the end button is selected.

7. A non-transitory computer-readable storage medium storing computer program instructions that, when being executed by a processor of a terminal device, cause the processor to perform:
   receiving a motion instruction from a server;
   displaying the motion instruction on a display interface of the terminal device;
   displaying a time countdown of a preset period together with the motion instruction on the display interface of the terminal device;
   obtaining a sensed data of a gyroscope equipped in the terminal device after the motion instruction is received and before the time countdown ends;
   sending the sensed data obtained by the terminal device to the server; and
   receiving a verification result from the server, the verification result being determined according to whether the two motion trails of the terminal device meet a requirement of the motion instruction based on the sensed data,
   wherein:
   the motion instruction includes: performing a first movement within a first time period and performing a second movement within a second time period after the first time period; and
   sending the sensed data comprises: sending the sensed data carrying motion trails of both the first movement and the second movement to the server.

8. The non-transitory computer-readable storage medium according to claim 7, wherein a movement instruction carried in the motion instruction includes at least one of: shaking up and down, shaking left and right, tilting forward, tilting backward, tilting left, tilting right, and following a symbolic stroke.

9. The non-transitory computer-readable storage medium according to claim 7, wherein determining whether the two motion trails of the terminal device constructed meet the requirement of the motion instruction based on the sensor data comprises:
   respectively determining whether each of the two constructed motion trails comprises a motion trail of the terminal device as instructed by the motion instruction; and
   determining whether the two motion trails are performed in a sequence as instructed by the motion instruction.

10. The storage medium according to claim 7, wherein the computer program instructions further cause the processor to perform:
    displaying a start button on the display interface when receiving the motion instruction from the server; and
    starting the time countdown after receiving a user selection on the start button.

11. The storage medium according to claim 7, wherein a movement instruction carried in the motion instruction includes: following a symbolic stroke while holding the terminal device at a predefined direction.

12. A terminal device, comprising:
    a memory; and
    a hardware processor coupled to the memory and configured to:
    receive a motion instruction from a server;
    display the motion instruction on a display interface of the terminal device;
    display a time countdown of a preset period together with the motion instruction on the display interface of the terminal device;
    obtain a sensed data of a gyroscope equipped in the terminal device after the motion instruction is received and before the time countdown ends; and
    send the sensed data to the server; and
    receiving a verification result from the server, the verification result being determined according to whether a motion trail of the terminal device meets a requirement of the motion instruction based on the sensed data, wherein:
the motion instruction includes: performing a first movement within a first time period and performing a second movement within a second time period after the first time period; and
the hardware processor is further configured to send the sensed data carrying motion trails of both the first movement and the second movement to the server.

13. The terminal device according to claim 12, wherein a movement instruction carried in the motion instruction includes at least one of: shaking up and down, shaking left and right, tilting forward, tilting backward, tilting left, tilting right instruction, and following a symbolic stroke.

14. The terminal device according to claim 12, wherein the hardware processor is further configured to:
display a start button on the display interface when receiving the motion instruction from the server; and
start the time countdown after receiving a user selection on the start button.

15. The terminal device according to claim 14, wherein the hardware processor is further configured to:
display an end button on the display interface when obtaining the sensed data;
receive a user selection on the end button; and
obtain the sensed data of the gyroscope within a period between a time when the start button is selected and a time when the end button is selected.

16. The terminal device according to claim 12, wherein a movement instruction carried in the motion instruction includes: following a symbolic stroke while holding the terminal device at a predefined direction.

\* \* \* \* \*